United States Patent [19]

Chang

[11] Patent Number: 5,737,736

[45] Date of Patent: Apr. 7, 1998

[54] METHOD AND APPARATUS FOR STORING OBJECTS USING A C-STRUCTURE AND A BIND DESCRIPTOR

[75] Inventor: Walter Chang, San Jose, Calif.

[73] Assignee: Oracle Corporation, Redwood Shores, Calif.

[21] Appl. No.: 586,139

[22] Filed: Jan. 16, 1996

Related U.S. Application Data

[63] Continuation of Ser. No. 283,052, Jul. 29, 1994, abandoned.

[51] Int. Cl.[6] ........................................ G06F 15/00
[52] U.S. Cl. .................. 707/102; 707/4; 707/100; 707/101; 707/103; 707/102; 345/335
[58] Field of Search ........................ 395/613, 614, 395/612, 611, 335, 604; 707/100, 101, 102, 103, 4; 345/335

[56] References Cited

U.S. PATENT DOCUMENTS

| | | | |
|---|---|---|---|
| 5,197,005 | 3/1993 | Schwartz et al. | 364/419 |
| 5,235,701 | 8/1993 | Ohler et al. | 395/600 |
| 5,297,279 | 3/1994 | Bannon et al. | 395/600 |
| 5,367,675 | 11/1994 | Cheng et al. | 395/600 |
| 5,432,930 | 7/1995 | Song | 395/600 |
| 5,432,936 | 7/1995 | Gray et al. | 395/700 |
| 5,437,027 | 7/1995 | Bannon et al. | 395/600 |
| 5,475,845 | 12/1995 | Orton et al. | 395/700 |
| 5,499,371 | 3/1996 | Henniger et al. | 395/700 |
| 5,519,867 | 5/1996 | Moeller et al. | 395/700 |
| 5,615,362 | 3/1997 | Jensen et al. | 395/614 |
| 5,627,979 | 5/1997 | Chang et al. | 395/335 |

Primary Examiner—Thomas G. Black
Assistant Examiner—Jean R. Homere
Attorney, Agent, or Firm—Fliesler, Dubb, Meyer & Lovejoy LLP

[57] ABSTRACT

The present invention provides a system that manages the storage of the definition and user information used by developers. This information defines and represents forms, reports, books documents, graphics documents and other resources available for use by a developer. The invention creates and manipulates this information for storage in a variety of ways (e.g. an Oracle V6/V7 database, or in native files). The invention is referred to as "resource object store" (ROS) and allows client 'definition' information in the form of c'structure data to be directly mapped into a representation suitable for persistent and portable storage in either a native ROS file or in a database. By using the ROS API, clients and Tools can transparently access the tool definition data from either the database or native files.

62 Claims, 7 Drawing Sheets

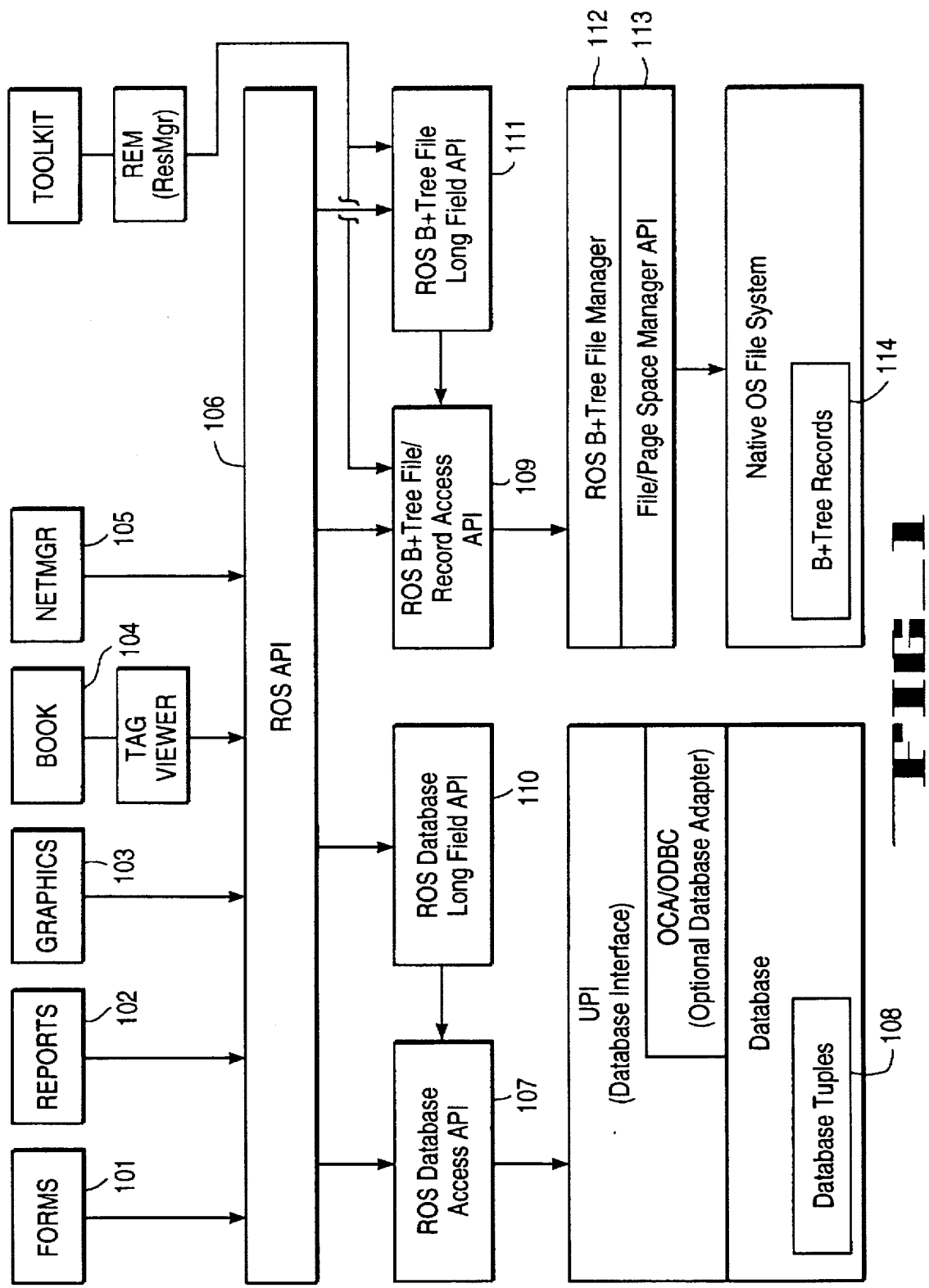
FIG_1

```
ROS Bind Descriptor for USER_TABLES                                          C-Structure
externdef
CONST_W_PTR
rosSTRUCT_DESC(rostblbdx,19) =                                               typedef
{ rosT(USER_TABLES), 19, sizeof(rostbl)),                                    struct rostbl
  DEF(TABLE_NAME,       rostbl, tablenam,   rosTYPE_TEXP,   NULL, 31)        {
  DEF(TABLESPACE,       rostbl, tablspcn,   rosTYPE_TEXTP,  NULL, 31)          text  *tablenam
  DEF(CLUSTER_NAME,     rostbl, clustrnm,   rosTYPE_TEXTP,  NULL, 31)          text  *tablspcn
  DEF(PCT_FREE,         rostbl, pctfree,    rosTYPE_SB4,    NULL, 22)          text  *clustrnm
  DEF(PCT_USED,         rostbl, pctused,    rosTYPE_SB4,    NULL, 22)          sb4   pctfree
  DEF(INI_TRANS,        rostbl, initrans,   rosTYPE_SB4,    NULL, 22)          sb4   pctused
  DEF(MAX_TRANS,        rostbl, maxtrans,   rosTYPE_SB4,    NULL, 22)          sb4   initrans
  DEF(INITIAL_EXT,      rostbl, intlextn,   rosTYPE_SB4,    NULL, 22)          sb4   maxtrans
  DEF(NEXT_EXTENT,      rostbl, nextextn,   rosTYPE_SB4,    NULL, 22)          sb4   intlextn
  DEF(MIN_EXTENTS,      rostbl, minextnt,   rosTYPE_SB4,    NULL, 22)          sb4   nextextn
  DEF(MAX_EXTENTS,      rostbl, maxextnt,   rosTYPE_SB4,    NULL, 22)          sb4   minextnt
  DEF(PCT_INCREASE,     rostbl, pctincre,   rosTYPE_SB4,    NULL, 22)          sb4   maxextnt
  DEF(BACKED_UP,        rostbl, backedup,   rosTYPE_TEXTC,  NULL,  1)          sb4   pctincre
  DEF(NUM_ROWS,         rostbl, numrows,    rosTYPE_SB4,    NULL, 22)          text  backedup
  DEF(BLOCKS,           rostbl, blocks,     rosTYPE_SB4,    NULL, 22)          sb4   numrows
  DEF(EMPTY_BLOCKS,     rostbl, emptyblc,   rosTYPE_SB4,    NULL, 22)          sb4   blocks
  DEF(AVG_SPACE,        rostbl, avgspace,   rosTYPE_SB4,    NULL, 22)          sb4   emptyblc
  DEF(CHAIN_CNT,        rostbl, chaincnt,   rosTYPE_SB4,    NULL, 22)          sb4   avgspace
  DEF(AVG_ROW_LEN,      rostbl, avgrowle,   rosTYPE_SB4,    NULL, 22)          sb4   chaincnt
};                                                                            sb4   avgrowle
                                                                            } rostbl;
```

FIG. 2

| TABLE_NAME | rostbl | tablenam | rosTYPE_TEXTP | NULL | 31 |
|---|---|---|---|---|---|

| text *tablenam |
|---|

FIG. 6

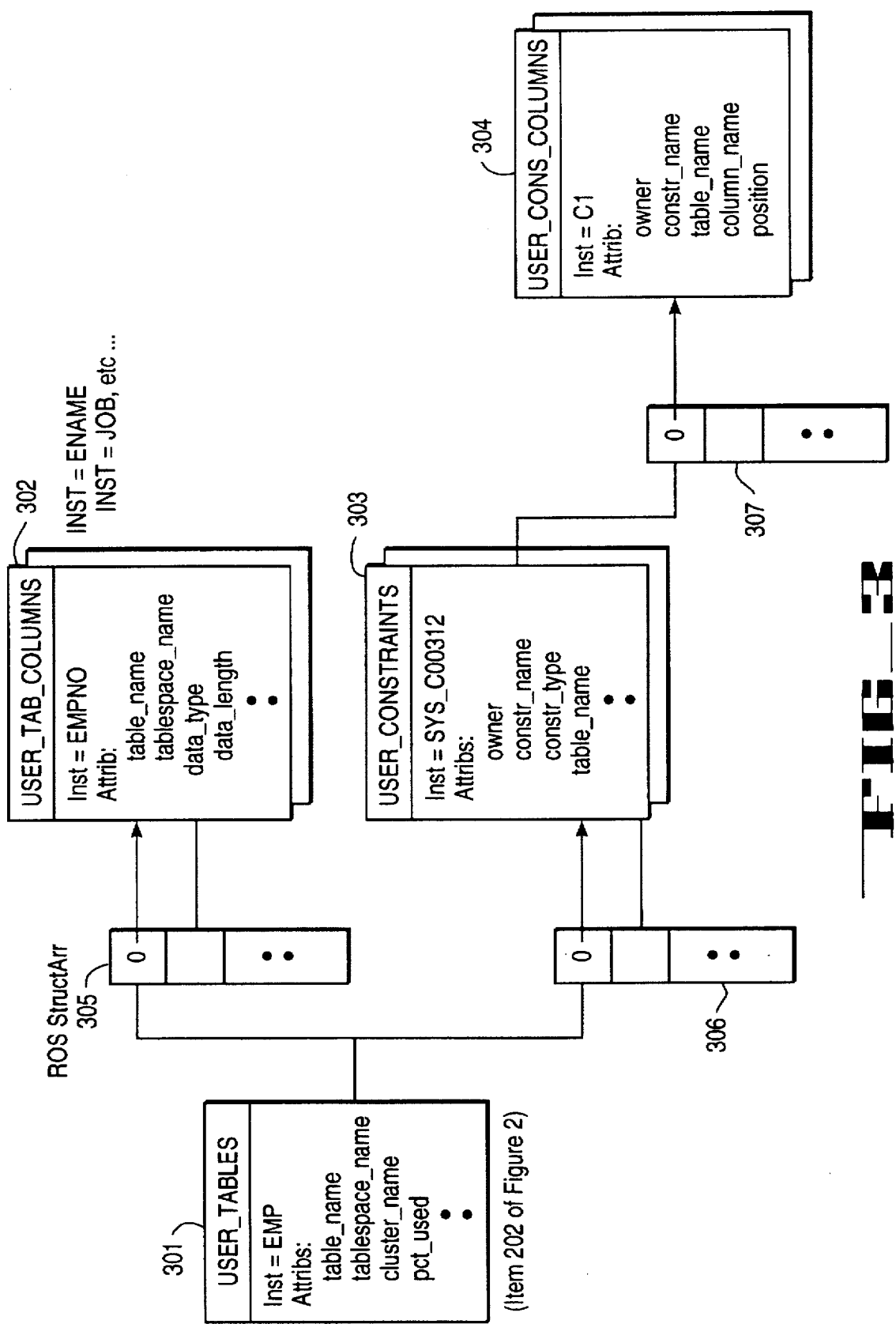
FIG_3

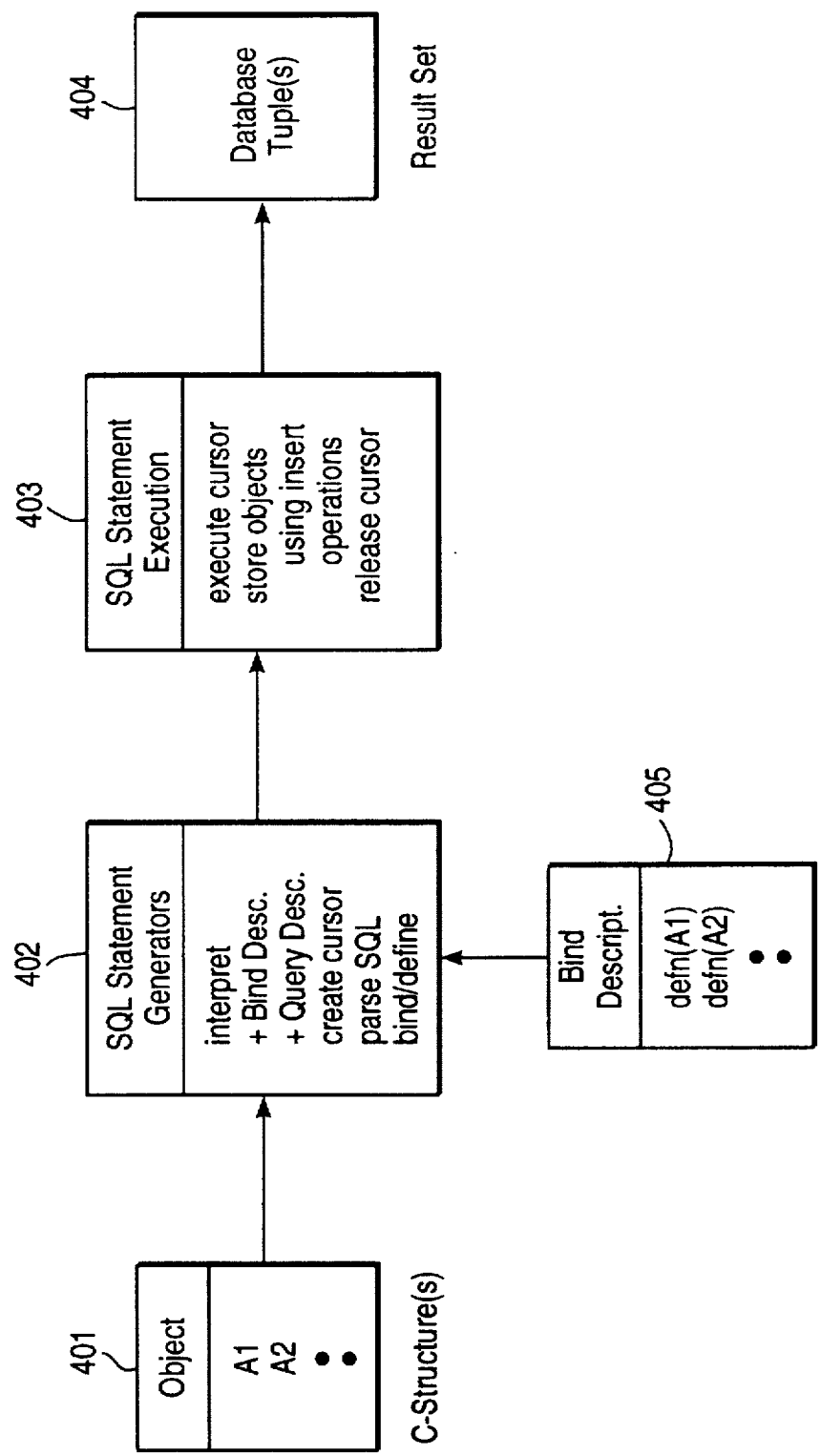
FIG_4A

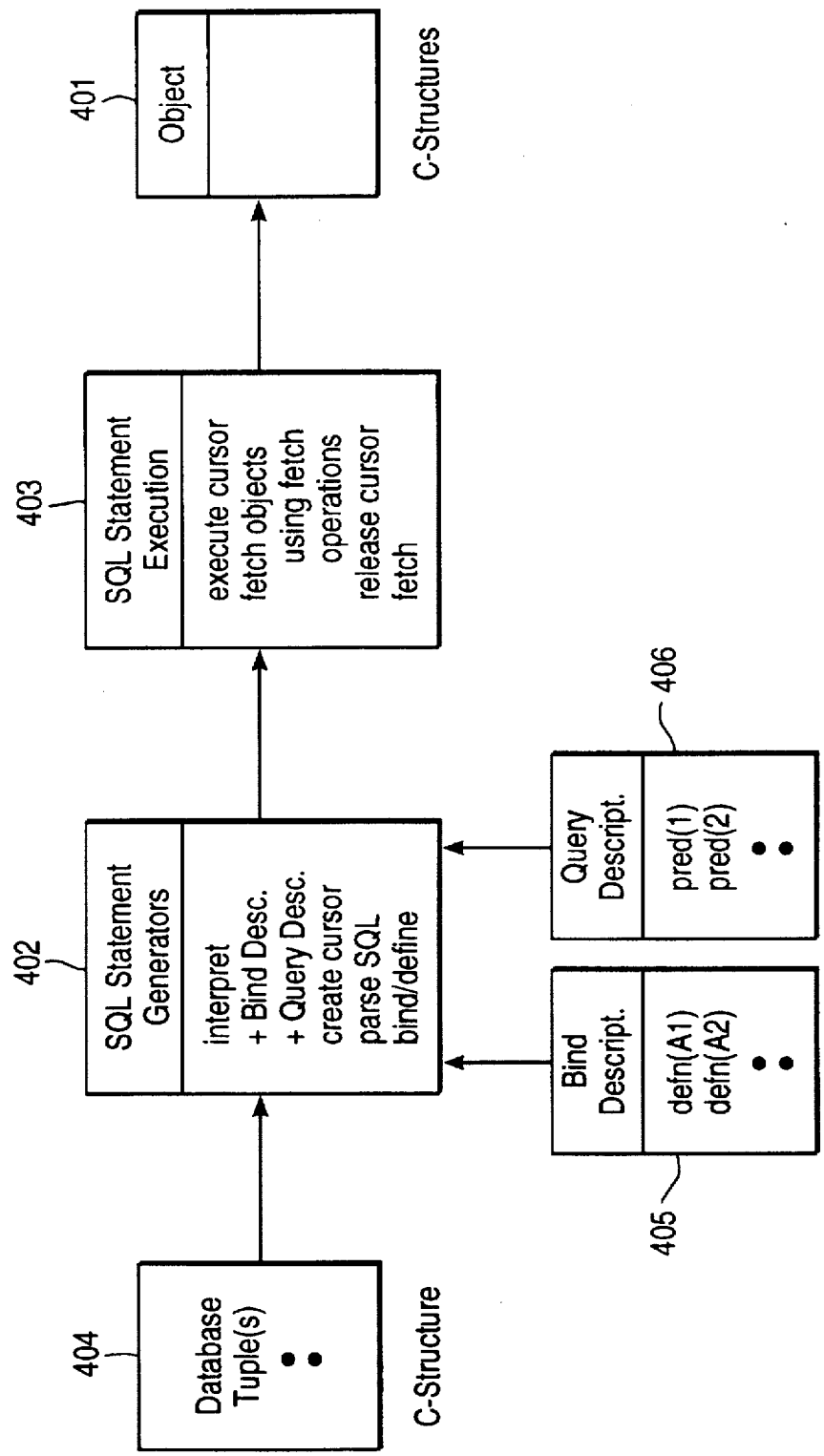
FIG._4B

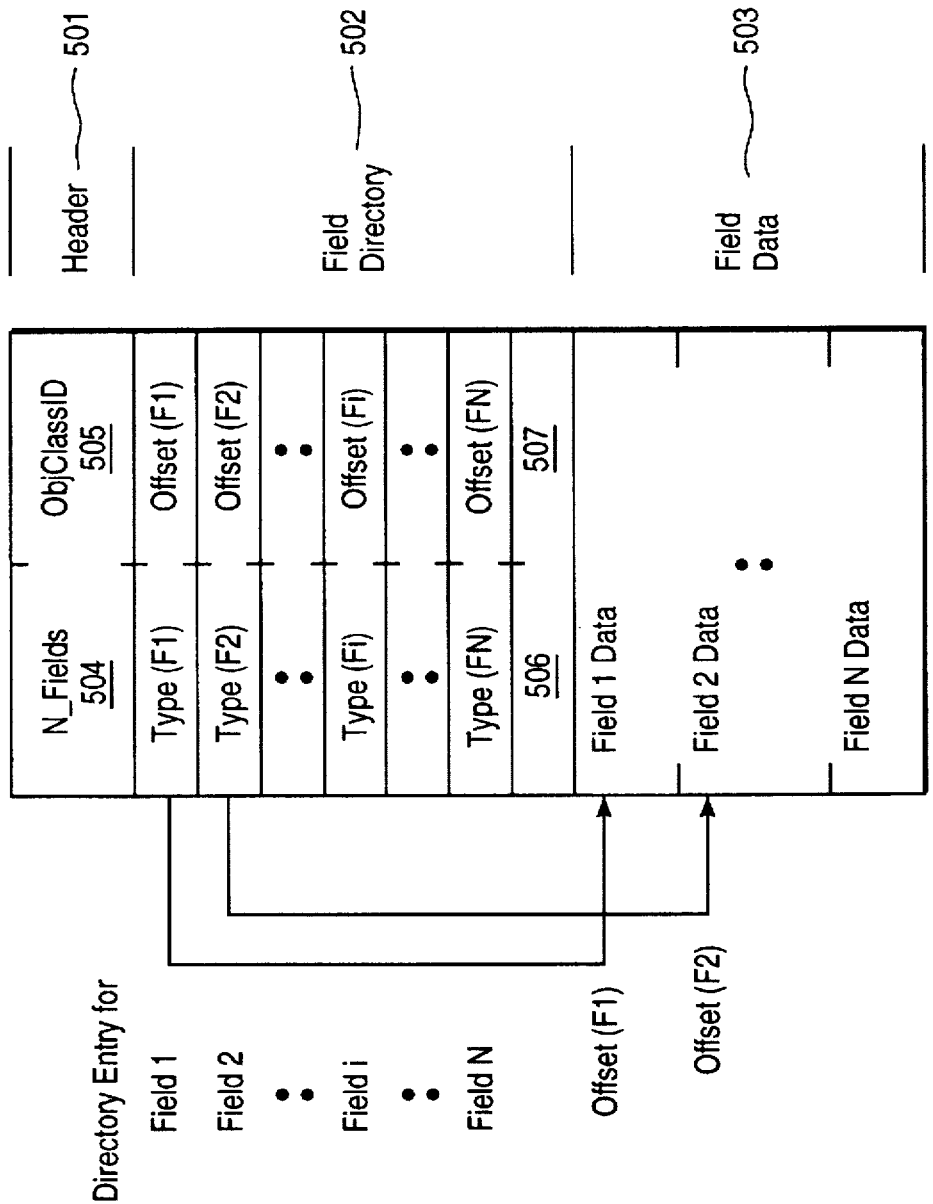
FIG_5

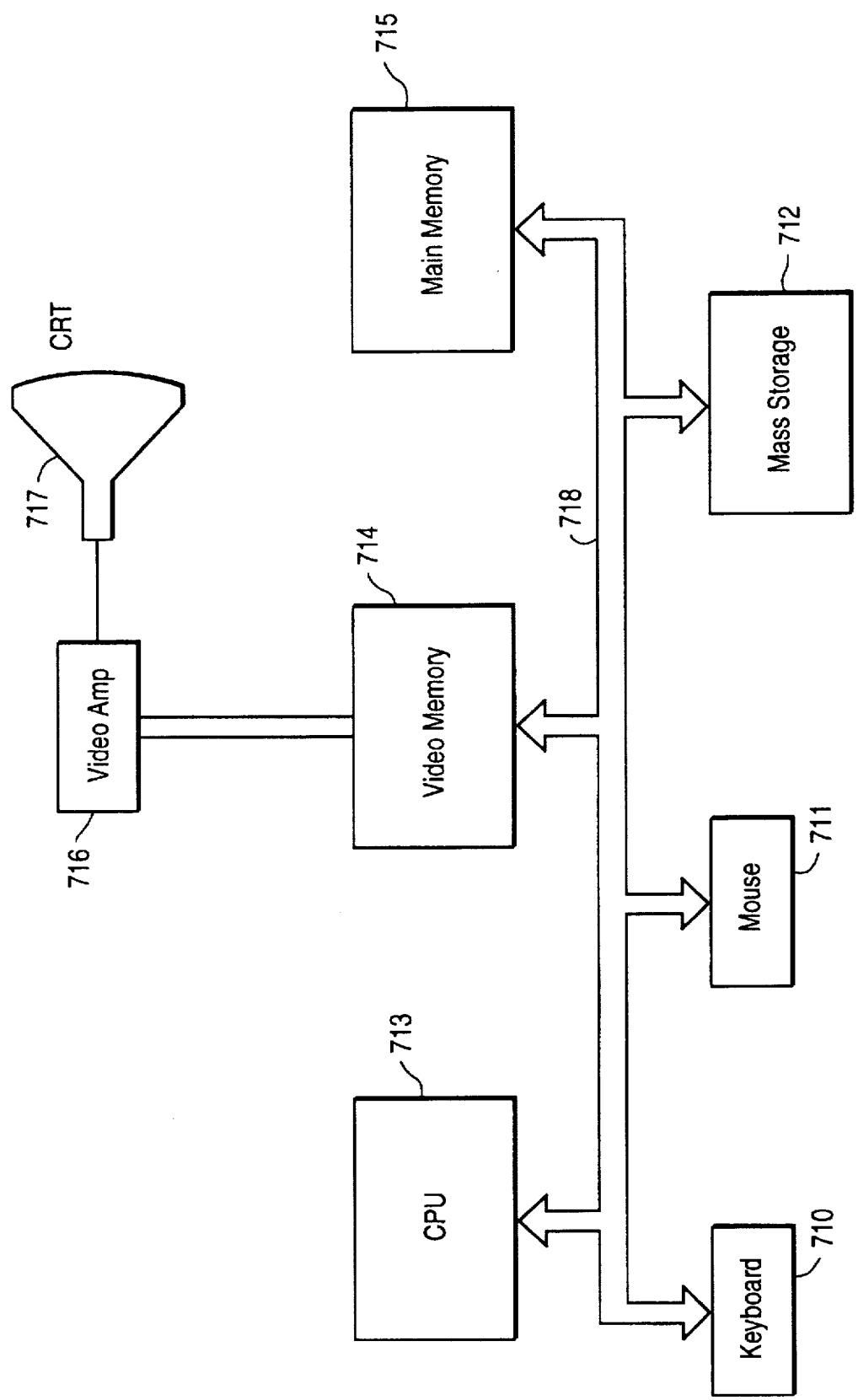
FIG_7

5,737,736

METHOD AND APPARATUS FOR STORING OBJECTS USING A C-STRUCTURE AND A BIND DESCRIPTOR

This is a continuation of application Ser. No. 08/283,052, filed on Jul. 29, 1994, now abandoned.

BACKGROUND OF THE INVENTION

1. Field of the Invention

This invention relates to the field of generically storing software "objects" into computer file systems and databases for use by other software tools such as database application builders, reporting tools, and graphical visualization tools.

2. Background Art

Applications or database systems encapsulate information into "objects" which then become resources available to a tool or user. These objects are used to create forms, reports, documentation, and graphics. Special system software is needed to save, retrieve, and search for the stored objects. These resource objects themselves need to be portable across platforms and different operating systems. In this invention the system for managing the objects also provides a common service interface to tools and users and allows for the support of multi-language constraints.

Prior to object-oriented database systems, traditional (relational) databases and ad hoc file-based systems were used to store the types of resource objects described above. Prior art and technologies include the Oracle Toolkit 1 resource manager, and Macintosh® and Windows™ native resource managers. All of these technologies employ hoc file formats and offer little or no search capability. Further, these technologies do not incorporate the concept of automatic 'binding' of data objects to C programming language "c-structures", a crucial capability for simplifing the application programming effort required to use similar systems.

Applications using only relational database technologies are limited in performance and configuration flexibility, as well as complexity imposed by SQL based-programming interfaces. Furthermore, in many desktop environments, relational database systems may not be available or desirable for object storage due to security, performance or configuration constraints.

While object database systems have recently become popular, these systems generally require significant system overhead and administration to be usable. These object systems also are generally C++ based and frequently lack a small, lightweight generic object binding mechanism for C-language tools and applications. Examples of such systems are cited in R. G. G. Cattell, Object Data Management—Object-Oriented and Extended Relational Database Systems, Addison-Wesley Publishing, New York, 1991.

In addition, both relational and object-oriented approaches to object store systems do not address object or versioning issues which become crucial in commercial production environments where definitions of objects may change between product releases. Some academic object-oriented systems address these issues, such as Banerjee, W. Kim, H-J Kim, and H. F. Korth, "Semantics and Implementation of Schema Evolution in Object-Oriented Database", Proceedings of ACM SIGMOD 1987 Annual Conference, San Francisco, May 1987, but do not provides a mechanism for direct support of object versioning.

SUMMARY OF THE INVENTION

The present invention provides a system that manages the storage of the definition and user information used by developers. This information defines and represents forms, reports, books documents, graphics documents and other resources available for use by a developer. The invention creates and manipulates this information for storage in a variety of ways (e.g. an Oracle V6/V7 database, or in native files).

The invention is referred to as "resource object store" (ROS) and allows client 'definition' information in the form of c'structure data to be directly mapped into a representation suitable for persistent and portable storage in either a native ROS file or in a database. By using the ROS API, clients and Tools can transparently access the tool definition data from either the database or native files.

The ROS/API allows client applications to retrieve single c-structure objects or sets of objects based on qualifications specified in a query. The underlying object store consists of:
1. a c-structure object mapping layer to e.g., V6/V7 RDBMS,
2. a file-based B+tree technology (for the indexing and storage of c-structures)
3. a linear paged data store (long field manager) for large (e.g. megabyte size) object. This may be used to store multi-media objects such as sampled audio, image, or video data.
4. a SQL module for database access.

The present invention provides efficient and portable c-structure bindings between persistent and run-time data. It also provides a "meta"-data mechanism to allow client programs to automatically describe and interpret system and client c-structure data. Another feature of the invention is the ability to develop a flexible file-based object storage manager to support c-structure objects that contain standard datatypes (including variable-length data) and providing a common long field ("blob") abstraction for both the file and database. The present invention results in a common mechanism for the versioning of client meta data and instance data. This mechanism effectively provides the ability to adaptively retrieve tools data whose definition may change from version to version. An extensible scripting facility is provided based on extensions to the Forms.inp format that allow definitions and objects to be loaded and saved in a human readable/editable format.

The invention in this technology allows products to use:
a. a common portable object storage mechanism for both files and database
b. a common schema definition mechanism for both files and the database
c. a common scripting language to load and read human readable/editable representations of the c-structure object definitions and instances.

BRIEF DESCRIPTION OF THE DRAWINGS

FIG. 1 is a block diagram of the present invention.

FIG. 2 is a diagram of a bind descriptor for c-structures of the present invention.

FIG. 3 is an example of binding complex objects

FIG. 4A is an example of storage of c-structures into a database.

FIG. 4B is an example of retrieval of c-structures from a database.

FIG. 5 is an example of a linear resource object store object format.

FIG. 6 illustrates the first entry c-structure in the bind descriptor of FIG. 2.

FIG. 7 illustrates a computer system on which the present invention can be implemented.

DETAILED DESCRIPTION OF THE INVENTION

In the following description, numerous specific details, such as database type, programming language, etc, are set forth in detail in order to provide a more thorough description of the invention. It will be apparent, however, to one skilled in the art, that the present invention may be practiced without these specific details. In other instances, well known features have not been described in detail in order to not unnecessarily obscure the present invention.

FIG. 1 is a block diagram illustrating the present invention. A plurality of tools, e.g. Forms 101, Reports 102, Graphics 103, book/tag viewer 104 and Netmgr 105 each have an associated collection of objects (c structures). The collection of objects for each tool makes up the definition schema for that tool. In the present invention, there is associated with each of the structures in the definition schema of a tool one bind descriptor that consists of the list of attributes that describes the types of that object. In the present invention, the bind descriptor includes:
attribute name
attibute data type
attribute size
attribute offset An interface layer 106 is provided for each tool. The interface layer 106 is the resource object store of the present invention. Resource object store 106 permits a tool to provide a bind descriptor for an associated object, as well as a pointer to the object. Objects provided to the resource object store 106 may be stored to a database or to a file tree. Database stores are provided to the database access API 107 and in turn are converted to database-tuples of the object 108. Alternatively, the objects are provided to ROS B+ file access 109 and stored as records in a B+ tree 110.

When client provided long fields or "blobs" are stored or retrieved to/from the database, the ROS long field API 110 is used. Object to be stored in the ROS B+tree file use the same ROS interface 106, but are routed to the ROS B+tree File API 109 where the objects are converted into a linear record format and then stored in the ROS B+Tree through the ROS B+Tree File Manager services 112. The B+Tree File Manager subsystem in turn uses the File/Page Space Manager 113 to physically store records on the Operating System (OS) File 114.

The resource object store thus provides a common interface so that tools are not required to know whether they are acting with a file system or a database.

The present invention uses a c-structure bind mechanism to completely describe a clients object. The client can then use c language to access objects. The bind descriptor allows objects in a client's object to be persistently manipulated. Once a bind descriptor exists, the client no longer needs to write c language code to store the object and no longer needs to write database code.

Data Bind Concepts

Model

A ROS store is opened by a client and used as a local object/definition data store. Data access is implemented by use of client provided (or automatically generated) Bind Descriptors (BD) for access to stored row data in a database, or c-structures stored in ROS files.

Architecture

Resource object store is a top level api for storing different types of structures (simple or complex c-structures) to and from either a database or persistent storage representation (in a flat file). The system supports simple or multiple c-structures that are portably persistent and are searchable by provided predicates containing search attributes.

The system internally synthesizes SELECT, INSERT, DELETE, and UPDATE statements for resource object store operations to transfer objects on the database side. Canonical ROS SQL forms are as follows:

```
selectC1,C2, ... Cn
    from T1
    where (Ci COMP_OP :B001) BOOL_OP1 (Ci+1 COMP_OP :B002) ...
insert into T1
    (C1,C2, ... Cn)
    values (:B001, :B002 ... :B0Oi)
delete from T1
    where (Ci COMP_OP :B001) BOOL_OP1 (Ci+1 COMP_OP 'B002) ...
update T1
    set C1 = :B001, C2 = :B002,
        Ci = :B0Oi
    where (Ci COMP_OP :Qoo1) BOOL_OP1 (Ci+1 COMP_OP :Q002) ...
```

Client c-structures are portably described by a bind descriptor and then bound to SQL statement variables. The bind descriptor is used to generate upibrv( ) and upidnf ( ) calls. C-structure field members are used as input/output variables. Data objects can be transferred as a set of homgeneous c-structures using resource object array interface.

FIG. 2 illustrates a resource object store bind descriptor for a c-structure. The bind descriptor 201 in the example is a bind descriptor for USER_TABLES and illustrates how the bind descriptor mechanism works for simple user data objects or resources. The data objects or resources are realized by the client as c-structures, for example, c-structure 202.

Referring to FIG. 2 and the detail entry of FIG. 6, a ROS Bind Descriptor 201 is used to describe each client c-structure 202. For each attribute member of the c-structure 202, the bind descriptor contains one entry which names the database field the c-structure attribute is stored or retrieved from, (e.g., "TABLE_NAME" 203), the name of the c-structure (e.g., rostbl 204), the name of the c-structure member (tableham 205) and the c-structure datatype member (rosTYPE_TEXTP 206), a complex object bind descriptor (NULL in the case of simple c-structures 207), and maximum length information (e.g, 31 bytes 208).

In the case when the c-structure data is stored in a non-database store such as the ROS B+tree linear store, the bind descriptor field name (203) is not used. The position of the entry in the bind descriptor then determines which position in the linear record the field data can be found (eg., the tablenam item 205) will be in the first position of the linear record.

In the cases that clients objects have complex structure in which objects are related to other objects through a hierarchy, ROS provides a binding mechanism whereby these complex structures can be stored or retrieved.

FIG. 3 illustrates how the basic binding mechanism described in FIG. 2 is extended to support storage and retrieval of complex hierarchical client c-structure data (e.g., 301–304). FIG. 3 illustrates c-structures used to form a complex object. FIG. 3 illustrates that an object can be comprised of USER_TABLES 301, USER_TAB_COLUMNS 302, USER_CONSTRAINTS 303, and USER_CONS_COLUMNS 304. In the example illustrated in FIG. 3, the root object USER_TABLES 301 contains references to one or more object types USER_TAB_COLUMNS 302, as well as zero or more object types USER_CONSTRAINTS 303. For each element of the complex object structure (301–304) a separate bind descriptors like the one described in FIG. 2 must exist. These separate bind descriptors are then linked together to allow a program algorithm to automatically store or retrieve the desired objects.

Multiple child objects (302, 303, 304) may be retrieved as part of the complex object structure. In order to reference multiple objects that a parent object (301,303) may need, a mechanism called a ROS StructureArray is used. This ROS Structure Array is variable length array of C or C++ language "pointers" that allow multiple child objects to be addressed from one parent object. An example C program algorithm for processing a complex object and associated bind descriptors is illustrated in Appendix 1.

FIG. 4A illustrates the storage of c-structures into a database. When the present invention is used to store c-structure objects 401, a SQL Statement generation module 402 interprets the objects bind descriptor 405 to generate the appropriate SQL INSERT statement. A SQL execution module 403 continues to execute SQL INSERT statements until all objects have been inserted as tuples 404 into the database.

FIG. 4B illustrates the retrieval of c-structures from the database. To retrieve objects from the database, (objects are internally stored as tuples 404), the SQL Statement Generation module 402 interprets both the objects Bind Descriptor 405 and a structure called a query descriptor 406 in order to create the needed SQL. Both the Bind Descriptor 405 and Query Descriptor 406 are provided by the client. The SQL Statement Generation module 402 then produces a SQL SELECT which is executed by the SQL Statement Execution Module 403. Tuples are fetched from the database until all tuples satisfying the query have been returned. As each tuple is fetched, it is converted into a c-structure object 401 for use by the client.

FIG. 5 illustrates a linear resource object store format. This linear structure consists of a Header 501, a Field Directory 502, and a Field Data Area 503. The field directory 502 includes entries for each field 1 through N. Each entry of the Field Directory consists of a Type component 506 and Offset component 507. The Type component is a tag that indicates the datatype of the field, the offset component contains the starting position of the field in the Field Data Area. The Field Data Area contains the actual data of the stored fields.

uiSTRING

The present invention includes a scheme for storing data strings in a centralized location. Application data access these stored uiStrings by using a multi-part uiStringID. This is of particular importance for internationalizing applications. Translation tools can extract and translate strings into the desired target language without having to access or replicate the invariant resource data associated with each particular tool.

There is a specific class of object known as ROSstring which is an object that carries information about an object. An advantage of the scheme is that the strings themselves are decoupled from their usage in an application. For example, in an interface, all usage of the strings is by an ID or reference.

Conceptually, all products that use the Resource Object Store should store their uiString data in one place and use only one access facility.

By centralizing all uiString data into one place, Oracle NLS groups can develop translation tools that extract and translate strings into the desired target language without having to access or replicate the invariant resource data associated with each particular product.

Translation in some languages may cause expansion of string text, a mechanism is necessary to dynamically adjust the ui presentation. One geometry management technology that can be used with the present invention is described in co-pending patent application No. 08/192,278 entitled "Method and Apparatus for Building Efficient and Flexible Geometry management Widget Classes", filed Feb. 4, 1994, assigned to the assignee of the present invention and incorporated herein by reference.

uiString Management

ROS uiString Table

In the present invention, uiStrings are stored in a fixed ROS object called the rosuis table. This table exists as a database table on the RDBMS side and as a set of variable length uiString records accessible by ID keys on the file side. A common interface is used to access stored uiStirngs on both the database and file side.

UiString ID/Naming Using the Database

Each uiString is identified by a multi-part ID assigned by the client. This ID has the form:
<OWNERNAME> <MODID> <GRPID> <STRINGID>

Actual values for OWNERNAME and MODID are obtained by the client. <GRPID> is a client assigned ID used to sub-partition strings within a document.

The aggregate <OWNERNAME> <MODID> <GRPID> <STRINGID> should be unique when ROS uiStrings are stored in the database. By specification of either the full four-part ID or some set of prefix fields, individual uiStrings or arrays of uiStrings may be retrieved.

UiString ID/Naming Using the ROS Files

When uiStrings are stored in ROS files, <OWNERNAME> and <MODID> are NOT stored in the preferred embodiment of the invention. The rosinf( ) function is used in either case. Clients provide <GRPID>. For example, a single resource file may contain multiple resource objects, each resource object is designated a GroupID. Each Group (Resource) itself can have a set of uiStrings. The MODID is implicitly used as file ID (and may be omitted for ROS files), but designates a resource document when resources are stored in the database.

Partitioning Invariant and uiString Data

In the preferred embodiment of the present invention, three different ways of partitioning invariant application/ product and uiString data are supported. Examples of invariant data are non-language specific information such as color, coordinate, and internal attribute information.

Case 1:

Using A Self-Contained Single ROS File for Each Language

In this embodiment, each ROS file is self-contained. Invariant data is replicated for each ROS file while uiStrings are translated. The major advantage of this method is that if necessary, the invariant layout data can be changed (fields lengthened, for example) if necessary.

| English | | | | |
|---|---|---|---|---|
| | uisID | | uiStrings L1 | |
| Invariant | 1,1 | 1,1 | "open" | |
| Layout | 1,2 | 1,2 | "close" | <-REM/ROS resource file |
| Data | 1,3 | 1,3 | "new" | |
| | 1,4 | 1,4 | "exit" | |
| French | | | | |
| | uisID | | uiStrings L2 | |
| Invariant | 1,1 | 1,1 | "ouvrez" | |
| Layout | 1,2 | 1,2 | "fermer" | <-REM/ROS resource file |
| Data | 1,3 | 1,3 | "noveau" | |
| | 1,4 | 1,4 | "sortez" | |

Case 2:

Using A Self-Contained Single ROS File for All Languages

Using one resource file for storing uiStrings of one or more different languages can be used. This approach benefits by the existence of basic geometry management technology to handle diverse string formatting and layout requirements.

| French | | | | | |
|---|---|---|---|---|---|
| | uisID | uiStrings: | | | |
| | | ROSSTRING | | ROSSTRINGER | |
| Invariant | 1,1 | 1,1 | "open" | 1,1 "ouvrez" | |
| Layout | 1,2 | 1,2 | "close" | 1,2 "fermer" | <-REM/ROS resource file |
| Data | 1,3 | 1,3 | "new" | 1,3 "noveau" | |
| | 1,4 | 1,4 | "exit" | 1,4 "sortez" | |
| | | | English | French | |

In this scheme, the ROS file holds multiple uistring tables, which are distinguished by the last two letters, those being the ISO two letter code for the language for which they hold translations. An exception to this is that the name ROSSTRING is still supported, for upward compatibility, and it holds the uistring values for the base—or development—language (which need not necessarily be US English).

Clients access the table for the current language, determined by the environment settings used by LI. In retrieving uistring data, clients obtain the ISO two letter language code by calling the LI function li linfo( ), passing LILABBR as the li item of interest. This is appended to the common prefix, "ROSSTRING", and strings are retrieved from that table. If that table is not present, clients default to using the base language, and retrieve strings from the table called "ROSSTRING". Clients continue to store uistrings in the base language table.

Case 3:

Partitioning Invariant and uiString Parts

The final option presented is the one that most closely resembles the approach taken today with .msg files. Separate files are used to store the uiStrings specific to each language. Mappings between uiStringIDs are preserved between all uiString files and the invariant resource file.

| Invariant | | English | | |
|---|---|---|---|---|
| | uisID | L1 | uiStrings | |
| Invariant | 1,1 | 1,1 | "open" | |
| Layout | 1,2 | 1,2 | "close" | <-REM/ROS resource file |
| Data | 1,3 | 1,3 | "new" | |
| | 1,4 | 1,4 | "exit" | |
| | REM/ROS resource file | | | |
| | | French | | |
| | | L2 uiStrings | | |
| | 1,1 | "ouvrez" | | |
| | 1,2 | "fermer" | | <-REM/ROS resource file |
| | 1,3 | "noveau" | | |
| | 1,4 | "sortez" | | |

ROS is structured so that clients that use ROS services directly can use any one of these three options. The preferred embodiment is the model presented in Option 2.

Accessing the ROS uiString Table

A special ROS object "rosSTRINGS" is available for clients to store all uiStrings. uiStrings stored in the rosSTRINGS table use the bind structure described below. Thus, clients that need to access stored uiStrings use the rosSTRING substore and uiStringBind structure. A special ros.h constant rosTAB_STRINGS contains this name. All definitions relating to rosuistring objects can be found in the include file rosuis.h.

uiString ROS Binding

From the TK2 uiString definition, a uiString consists of:

```
/*A string*/
typedef
  struct uist
  {
    text *str_uist;           /* pointer to string buffer*/
    size_t len_uist;          /* size of the string (bytes count)*/
    uics cs_uist;             /* character set used for that spring*/
  } uist;
/* A ROS ui string*/
typedef struct rosuis {
  text    *owner_rosuis;    /* the Owner of this string         */
  ub4     modid_rosuis;     /* the Module ID of this string     */
  ub4     grpid_rosuis;     /* the Group ID of this string      */
  ub4     strid_rosuis;     /* the String ID within the Doc     */
  sb4     ulfid_rosuis;     /* uiString lfid for very large strings */
```

```
    UISTRING    uis_rosuis;     /* the original uiString    */
} rosuis;
```

Fetching

Clients may fetch ROS uiStrings using this structure along with its bind definition and the appropriate query descriptor. This is possible since queries can specify fields not present in the bind descriptor.

Inserting and Deleting

In order to insert or delete ROS uiStrings, clients provide values for the additional ID fields (<OWNERNAME> <MODID> <GRPID> <STRID>).

The rosinf( ) function was added to allow ROS uiStrings to be inserted into the database or ROS file using the same call. On the database side, OWNER, MODID, and GRPID values provided in the insert "query" descriptor specify these values as constants.

The rosdel( ) function was fixed to allow ROS uiStrings to be deleted based on OWNER and MODID values provided as constants in the delete query predicates.

On the file side, rosinif( ) and rosdel( ) ignore the query descriptor values and use the values provided in the actual structure.

The corresponding bind descriptor for a ROS uiString is:

Also, the code uiTEXT NULLTERMINATED used to indicate a null-terminated c string is defined as a (size_t) value of −1 which may end up as a type other than int or a signed type such as a ub(something) on some platforms. If this is the case, the use of the (−1) value is non-portable. One solution is to define a platform independent value for uiTEXT_NULLTERMINATED.

Currently, uiTEXT_NULLTERMINATED values should not be stored or returned. Clients should explicitly compute the length of their null-terminated strings and store this value.

ROS uiString API

Clients insert, fetch, and delete uiStrings using ROS rosins( ), rosfet( ) and rosdel( ) functions.

Computer System

The present invention can be implemented on a network of general purpose computers. The network may be part of a database system such as an Oracle V6/V7 system. One such computer is illustrated in FIG. 7. A keyboard 710 and mouse 711 are coupled to a bi-directional system bus 718. The keyboard and mouse are for introducing user input to

```
#define rosuis_NFIELDS 6
#ifdef ROSUIS_CONSTWPTR_EXTERNDEF
externdef
CONST_W_PTR
rosSTRUCT_DESC(rosuisBind, rosuis_NFIELDS) =
[ROSTAB_STRINGS, ROSUIS_NFIELDS, sizeof(rosuis),
    rosDEF("groupid",rosuis,grpid_rouis,         rosTYPE_UB4, NULL, 0,0,0),
    rosDEF("stringid",rosuis,strid_rouis,        rosTYPE_UB4, NULL, 0,0,0),
    rosDEF("lfid",rosuis,ulfid_rosuis,           rosTYPE_UB4,NULL, 0,0,0),
    rosDEF("cs",rosuis,uis_rosuis.cs_uist,       rosTYPE_UWORD, NULL, 0,0,0),
    rosDEF("len",rosuis,uis_rosuis.len_uist,  rosTYPE_SIZET, NULL, 0,0,0),
    rosDEF("str",rosuis,uis_rosuis.str_uist,     rosTYPE_LBINARYP, NULL, 4,0,0),
};
```

Toolkit 2 Implementation of uiStrings

Due to the fact that len is defined as a size t and cs uiCharset is a uword, in terms of storage mappings, both platform specific datatypes are not portable and must bind to the smallest common representation. During access, values must be converted to appropriate types for platforms using different representations.

To deal with this problem, at least two solutions are possible:

A) Clients explicitly code the appropriate types for the uiString len and Charset fields for each particular platform. ROS does any necessary conversions (2 byte→4 byte or 4 byte→2 byte) and requires that values for these fields are restricted to lie in the range of the smallest type.

B) ROS provides new pseudo-types:

rosTYPE_SIZET rosTYPE_BOOL and rosTYPE_UWORD (also, rosTYPE_SWORD)

which are defined to be the appropriate base ros types for a given platform. Clients use these types and ROS does any necessary 2←→4 byte conversions.

the computer system and communicating that user input to CPU 713. The computer system of FIG. 7 also includes a video memory 714, main memory 715 and mass storage 712, all coupled to bi-directional system bus 718 along with keyboard 710, mouse 711 and CPU 713. The mass storage 712 may include both fixed and removable media, such as magnetic, optical or magnetic optical storage systems or any other available mass storage technology. Bus 718 may contain, for example, 32 address lines for addressing video memory 714 or main memory 715. The system bus 718 also includes, for example, a 32-bit DATA bus for transferring DATA between and among the components, such as CPU 713, main memory 715, video memory 714 and mass storage 712. Alternatively, multiplex DATA/address lines may be used instead of separate DATA and address lines.

In the preferred embodiment of this invention, the CPU 713 is a 32-bit microprocessor manufactured by Motorola, such as the 680X0 processor or a microprocessor manufactured by Intel, such as the 80X86, or Pentium processor. However, any other suitable microprocessor or microcomputer may be utilized. Main memory 715 is comprised of dynamic random access memory (DRAM). Video memory 714 is a dual-ported video random access memory. One port of the video memory 714 is coupled to video amplifier 716. The video amplifier 716 is used to drive the cathode ray tube (CRT) raster monitor 717. Video amplifier 716 is well known in the art and may be implemented by any suitable means. This circuitry converts pixel DATA stored in video memory 714 to a raster signal suitable for use by monitor 717. Monitor 717 is a type of monitor suitable for displaying graphic images.

The computer system described above is for purposes of example only. The present invention may be implemented in any type of computer system or programming or processing environment.

Thus, a method for storing resource objects has been described.

```
Appendix 1: Algorithm for Retrieving Complex C-Structures
================== C header file ==================
/*---------------------------------------------------+
** structures and bind descriptors were generated by:
**
** - rosbindgen utility
**     single char fields must be manually fixed
**     binary longs with no len field must map to textPs
**     binary longs with separate len field must be manually coded
**
** - rosStrcArr entries manually coded
**
**   this file shows how Bind Descriptors are nested to allow complex
**   object processing.
*/
#ifndef S
#include <s.h>
#endif
#ifndef ROS
#include <ros.h>
#endif
*/---------------------------------------------------+
** ROS c-structure def. for USER_CONS_COLUMNS        |
** --------------------------------------------------+
*/
typedef
  struct USER_CONS_COLUMNS
    {
      text *owner;
      text *constr_name;
      text *table_name;
      text *column_name;
      sb4  position;
    } USER_CONS_COLUMNS, *USER_CONS_COLUMNSP;
/*---------------------------------------------------+
** ROS struct bind def. for USER_CONS_COLUMNS        |
** --------------------------------------------------+
*/
externdef
CONST_W_PTR
rosSTRUCT_DESC(USER_CONS_COLUMNS_bind,5) =
{
  rosT("USER_CONS_COLUMNS"), 5, sizeof (USER_CONS_COLUMNS),
  rosDEF("owner",        USER_CONS_COLUMNS, owner,        rosTYPE_TEXTP,NULL,31,0,0),
  rosDEF("constraint_name", USER_CONS_COLUMNS, constr_name, rosTYPE_TEXTP,NULL, 31,0,0),
  rosDEF("table_name",   USER_CONS_COLUMNS, table_name,   rosTYPE_TEXTP,NULL, 31,0,0),
  rosDEF("column_name",  USER_CONS_COLUMNS,column_name,   rosTYPE_TEXTP,NULL, 31,0,0),
  rosDEF("position",     USER_CONS_COLUMNS,position,      rosTYPE_SB4,  NULL, 22,0,0),
}
/*---------------------------------------------------+
** ROS c-structure def. for USER_CONSTRAINTS          |
** --------------------------------------------------+
*/
typedef
  struct USER_CONSTRAINTS
    {
      text *owner;
      text *constr_name;
      text constr_type;
      text *table_name;
      dvoid *search_condition;
      text *r_owner;
      text *r_constr_name;
      rosStrcArr *constr_col;
    {USER_CONSTRAINTS, *USER_CONSTRAINTSP;
/*---------------------------------------------------+
** ROS struct bind def. for USER_CONSTRAINTS          |
```

```
**----------------------------------+
*/
externdef
CONST_W_PTR
rosSTRUCT_DESC(USER_CONSTRAINTS_bind,8) =
{ rosT("USER_CONSTRAINTS"), 8, sizeof(USER_CONSTRAINTS),
  rosDEF("owner",    USER_CONSTRAINTS,owner,   rosTYPE_TEXTP,
         NULL, 31,0,0),
  rosDEF("constraint_name", USER_CONSTRAINTS, constr_name, rosTYPE_TEXTP,
         NULL, 31,0,0),
  rosDEF ("constraint_type", USER_CONSTRAINTS, constr_type, rosTYPE_TEXTCHAR,
         NULL, 1,0,0),
  rosDEF ("table_name",   USER_CONSTRAINTS, table_name,  rosTYPE_TEXTP,
         NULL,31, 0,0),
  rosDEF ("search_condition ,USER_CONSTRAINTS, search_condition, rosTYPE_TEXTP,
         NULL,32,0,0)
  rosDEF ("r_owner",   USER_CONSTRAINTS, r_owner, rosTYPE_TEXTP,
         NULL,31,0,0),
  rosDEF ("r_constraint_name", USER_CONSTRAINTS r_constr_name, rosTYPE_TEXTP,
         NULL, 31,0,0),
  rosNEST("?",          USER_CONSTRAINTS,constr_col,
         rosTYPE_STRUCTARRP, &USER_CONS_COLUMNS_bind,0,0,0),
/* ----------------------------------+
** ROS c-structure def. for USER_TAB_COLUMNS    |
** ----------------------------------+
*/
typedef
 struct USER_TAB_COLUMNS
    {
     text *table_name;
     text *column_name;
     text data_type[10];
     sb4   data_length;
     sb4   data_precision;
     sb4   data_scale;
     text nullable;
     sb4 column_id;
     sb4 default_length;
     dvoid * data_default;
    } USER_TAB_COLUMNS, *USER_TAB_COLUMNSP;
/* ----------------------------------+
** ROS struct bind def. for USER_TAB_COLUMNS    |
** ----------------------------------+
*/
#define UTC USER_TAB_COLUMNS
externdef
CONST_W_PTR
rosSTRUCT_DESC (USER_TAB_COLUMNS_bind,10) =
{ rosT("USER_TAB_COLUMNS"), 10, sizeof(USER_TAB_COLUMNS),
  rosDEF("table_name",  UTC, table_name, rosTYPE_TEXTP,   NULL, 30,0,0),
  rosDEF("column_name", UTC, column_name, rosTYPE_TEXTP,  NULL, 30,0,0),
  rosDEF("data_type",   UTC,data_type[0], rosTYPE_TEXTARR, NULL,  9,0,0),
  rosDEF("data_length", UTC,data_length, rosTYPE_SB4,    NULL, 22,0,0),
  rosDEF("data_precision",UTC,data_precision, rosTYPE_SB4,    NULL, 22,0,0),
  rosDEF("data_scale",  UTC,data_scale,  rosTYPE_SB4,    NULL, 22,0,0),
  rosDEF("nullable",    UTC,nullable,    rosTYPE_TEXTCHAR,NULL, 1,0,0),
  rosDEF("column_id",   UTC,column_id,   rosTYPE_SB4,    NULL, 22,0,0),
  rosDEF("default_length",UTC,default_length, rosTYPE_SB4,    NULL, 22,0,0),
  rosDEF("data_default", UTC, data_default, rosTYPE_TEXTP,  NULL, 9,0,0),
};
/* ----------------------------------+
** ROS c-structure def. for USER_TABLES      |
** ----------------------------------+
*/
typedef
 struct USER_TABLES
    {
     text *table_name;
     text *tablespace_name;
     text *cluster_name;
     sb4   pct_free;
     sb4   pct_used;
     sb4   ini_trans;
     sb4   max_trans;
     sb4   initial_extent;
     sb4   next_extent;
     sb4   min_extents;
     sb4   max_extents;
     sb4   pct_increase;
     text backed_up;
     rosStrcArr *column;
```

```
    rosStrcArr *constr;
    }USER_TABLES, *USER_TABLESP;
/* ----------------------------------------+
** ROS struct bind def. for USER_TABLES    |
** ----------------------------------------+
*/
externdef
CONST_W_PTR
rosSTRUCT_DESC(USER_TABLES_bind,15) =
{ rosT("USER_TABLES"), 15, sizeof(USER_TABLES),
   rosDEF("table_name",      USER_TABLES,table_name, rosTYPE_TEXTP,  NULL, 30,0,0),
   rosDEF("tablespace_name", USER_TABLES,tablespace_name, rosTYPE_TEXTP,NULL, 30,0,0),
   rosDEF("cluster_name",    USER_TABLES,cluster_name, rosTYPE_TEXTP, NULL, 30,0,0),
   rosDEF("pct_free",        USER_TABLES,pct_free, rosTYPE_SB4,  NULL, 22,0,0),
   rosDEF("pct_used",        USER_TABLES,pct_used, rosTYPE_SB4, NULL, 22,0,0),
   rosDEF("ini_trans",       USER_TABLES,ini_trans, rosTYPE_SB4,  NULL, 22,0,0),
   rosDEF("max_trans",       USER_TABLES,max_trans, rosTYPE_SB4,  NULL, 22,0,0),
   rosDEF("initial_extent",  USER_TABLES,initial_extent, rosTYPE_SB4,NULL, 22,0,0),
   rosDEF("next_extent",     USER_TABLES,next_extent, rosTYPE_SB4,  NULL, 22,0,0),
   rosDEF("min_extents",     USER_TABLES,min_extents, rosTYPE_SB4,  NULL, 22,0,0),
   rosDEF("max_extents",     USER_TABLES,max_extents, rosTYPE_SB4,  NULL, 22,0,0),
   rosDEF("pct_increase",    USER_TABLES,pct_increase, rosTYPE_SB4,  NULL, 22,0,0),
   rosDEF("backed_up",       USER_TABLES,backed_up, rosTYPE_TEXTCHAR,NULL,  1,0,0),
   rosNEST ("",USER_TABLES,column,rosTYPE_STRUCTARRP,&USER_TAB_COLUMNS_bind,0,0,0),
   rosNEST ("",USER_TABLES, constr,rosTYPE_STRUCTARRP,&USER_CONSTRAINTS_bind,0,0,0),
};
/* ----------------------------+
** list of bind descriptors    |
** ----------------------------+
#define NSTRUCTDESC 4
externdef
CONST_W_PTR
rosStrcDesc *structdesc[ NSTRUCTDESC ] =
   { (rosStrcDesc *) &USER_TABLES_bind,
     (rosStrcDesc *) &USER_TAB_COLUMNS_bind,
     (rosStrcDesc *) &USER_CONSTRAINTS_bind,
     (rbsStrcDesc *) &USER_CONS_COLUMNS_bind,
   };
/* ------------------------------------+
** ROS c-structure def. for USER_INDEXES    |
** ------------------------------------+
*/
typedef
  struct USER_INDEXES
    {
       text *index_name;
       text *table_owner;
       text *table_name;
       text  table_type[12];
       text  uniqueness[10];
       text *tablespace_name;
       sb4   ini_trans;
       sb4   max_trans;
       sb4   initial_extent;
       sb4   next_extent;
       sb4   min_extents;
       sb4   max_extents;
       sb4   pct_increase;
    } USER_INDEXES, *USER_INDEXESP;
/* ------------------------------------+
** ROS struct bind def. for USER_INDEXES   |
** ------------------------------------+
*/
externdef
CONST_W_PTR
rosSTRUCT_DESC(USE_INDEXES_bind,13)
{ rosT("USER_INDEXES"), 13, sizeof(USER_INDEXES).
   rosDEF("index_name",  USER_INDEXES,index_name, rosTYPE_TEXTP,   NULL, 30,0,0).
   rosDEF("table_owner", USER_INDEXES,table_owner, rosTYPE_TEXTP,  NULL, 30,0,0),
   rosDEF("table_name",  USER_INDEXES,table_name, rosTYPE_TEXTP,   NULL, 30,0,0),
   rosDEF("table_type",  USER_INDEXES,table_type[0], rosTYPE_TEXTARR,NULL, 11,0,0),
   rosDEF("uniqueness",  USER_NDEXES,uniqueness [0], rosTYPE_TEXTARR,NULL,  9,0,0),
   rosDEF("tablespace_name",
          USER_INDEXES, tablespace_name, rosTYPE_TEXTP,NULL, 30,0,0),
   rosDEF("ini_trans",   USER_INDEXES,ini_trans, rosTYPE_SB4,   NULL, 22,0,0),
   rosDEF("max_trans",   USER_INDEXES,max_trans, rosTYPE_SB4,   NULL, 22,0,0),
   rosDEF("initial_extent", USER_INDEXES,initial_extent, rosTYPE_SB4, NULL, 22,0,0),
   rosDEF("next_extent", USER_INDEXES,next_extent, rosTYPE_SB4,  NULL, 22,0,0),
   rosDEF("min_extents", USER_INDEXES,min_extents, rosTYPE_SB4,  NULL, 22,0,0),
   rosDEF("max_extents", USER_INDEXES,max_extents, rosTYPE_SB4,  NULL,22,0,0),
```

```
rosDEF("pct_increase", USER_INDEXES,pct_increase, rosTYPE_SB4,   NULL, 22,0,0),
};
/* ----------------------------------------------+
** ROS c-structure def. for USER_IND_COLUMNS      |
** ----------------------------------------------+
*/
typedef
  struct USER_IND_COLUMNS
  {
    text *index_name;
      text *table_name;
      text *column_name;
      sb4  column_pos;
      sb4  column_length;
  } USER_IND_COLUMNS, *USER_IND_COLUMNSP;
/* ----------------------------------------------+
** ROS struct bind def. for USER_IND_COLUMNS      |
** ----------------------------------------------+
externdef
CONST_W_PTR
rosSTRUCT_DESC(USER_IND_COLUMNS_bind,5.) =
{ rosT("USER_IND_COLUMNS"), 5, sizeof(USER_IND_COLUMNS).
  rosDEF("index_name",  USER_IND_COLUMNS,index_name, rosTYPE_TEXTP, NULL, 30,0,0),
  rosDEF("table_name",  USER_IND_COLUMNS,table_name, rosTYPE_TEXTP,NULL, 30,0,0),
  rosDEF("column_name", USER_IND_COLUMNS,column_name, rosTYPE_TEXTP,NULL, 30,0,0),
  rosDEF("column_position",USER_IND_COLUMNS,column_pos,rosTYPE_SB4, NULL,22,0,0),
  rosDEF("column_length", USER_IND_COLUMNS,column_length,rosTYPE_SB4,NULL, 22,0,0),
};
=============== C program ===============
/*$Header*/
/* ------------------------------------------------------------------
** Copyright (c) Oracle Corporation 1990. All Rights Reserved.
**      NAME: trosco.c - complex object test
** DESCRIPTION: SQL database complex object store query, bind, load example
**      NOTES:
**    MODIFIED:  (MM/DD/YY)
**       wchang   08/02/91 - Created
*/
** complex object api prototype:
**  - merge nobjs and arrP ptr
**  - nested bind descriptors
**  - nested query descriptors
**  - persistant representation of
**     nested bind descriptor, query descriptor
*/
#include <stdio.h>
#include <ror.h>
#include <ros.h>
#include <trosco2.h>
#include <srosm.h>
#include <slstr.h>
#define UMODE rosUMODE_READONLY
#define WMODE rosWMODE_WAIT
#define ROSFET(u,s,t,o,b,q,nb,c) rosaft (u,s,t,o,b,q,nb,c,UMODE,WMODE)
#define ARRAYSIZE 10
#ifndef ORASTD_CONST_OK
#define CONST
#endif
#define T(s) ((text *) s)
#define HSTSIZE 256
main(argc, argv)
  int argc, **argv;
{
  rosstat   rc, detailrc;
  rosStoreID rosID;
  rosAttr   rosattr;
  utcn utc;
  sword curs;
  text owner[100];
  text msg[ 100 ];
  sword         i, j, k, m;
  rosStrcArr *tab_read_arrP;
  rosstrcArr *col_read_arrP;
  rosStrcArr *con_read_arrP;
  rosStrcArr *cc1_read_arrP;
  struct hstdef *hostP;
  rosQUERY_DESC(querydesc, 3);
  text tablename[ 120 ];
  sb4 id;
  USER_TABLES    *table_instP, *rootP;
```

```
USER_TAB_COLUMNS *col_instP;
USER_CONSTRAINTS *constr_instP;
hostP = (struct hstdef *)
    memset( (dvoid *)
        malloc( HSTSIZE ),0,HSTSIZE
    );
utc = utcnc();
rosattr.atusernm_rosAttr = (text *) "scott";
rosattr.atpasswd_rosAttr = (text *) "tiger";
rc = upiahs((struct hstdef *) hostP, (text *)NULL,0);
rc = upilon((struct hstdef *) hostP,
    rosattr.atusernm_rosAttr,slstrlen((char *) rosattr.atusernm_rosAttr),
    rosattr.atpasswd_rosAttr,slstrlen((char *) rosattr.atpasswd_rosAttr),
    0);
printf("rostco: SQL Database complex object test: logon rc=%d ",rc);
rosattr.attrmask_rosAttr = rosSTORE_A_TYPE |
        rosSTORE_A_DBHOSTDEF |
        rosSTORE_A_DBUPIARRAYSIZE |
        rosSTORE_A_DBUPIBUFFERLEN;
rosattr.atostype_rosAttr = rosSTORE_TYPE_DATABASE;
rosattr.athstdef_rosAttr = (struct hstdef *) hostP;
rosattr.atarrsiz_rosAttr = ARRAYSIZE;
rosattr.atbuflen_rosAttr = 32768;
if (argc > 1)
{ DISCARD strcpy((char *) tablename,argv[1]);
}
else
{DISCARD strcpy((char *) tablename,"EMP");
}
rc      = rosini(utc,  &rosattr );
rosID = rosopn(utc, &rosattr );
if (rosID == (rosStoreID) NULL)
{ DISCARD roserr(utc, rosID, &rc, &detailrc, msg, 100 );
    fprintf(stderr,"rostco: rosopn failed. rc=%d detailrc=%d ",rc,detailrc);
    exit(-1);
}
rosattr.attrmask_rosAttr = rosSTORE_A_OWNERNAME;
slstrcpy(owner, "SCOTT");
rosattr.atownern_rosAttr = owner;
rc = rossta( utc, rosID, &rosattr );
rc = rostfd(utc,rosID,"EMP"); fprintf(stdout,"rostfd(EMP) rc=%d ",rc );
rc = rostfd(utc,rosID,"XXX"); fprintf(stdout,"rostfd(XXX) rc=%d ",rc );
/*-----------------------------*/
/*      get root objects         */
/*-----------------------------*/
querydesc.qdnpreds_rosQDesc = 1;
querydesc.qdordrco_rosQDesc = 0;
rosqds (utc, &querydesc,
    1,"TABLE_NAME",
        rosCOMPOP_EQ,tablename,   /* LINEITEM */
        rosTYPE_TEXTP,
        rosBOOLOP_NOP);
rosattr.attrmask_rosAttr = rosSTORE_A_OWNERNAME;
slstrcpy(owner, "SYS");
rosattr.atownern_rosAttr = owner;
rc = rossta( utc, rosID, &rosattr );
rc = rostfd(utc, rosID, "USER_TABLES" );
rosattr.attrmask_rosAttr = rosSTORE_A_OWNERNAME;
slstrcpy(owner, "SCOTT");
rosattr.atownern_rosAttr = owner;
rc = rossta( utc, rosID, &rosattr );
rc = ROSFET(utc, rosID,
    "USER_TABLES", &tab_rea_arrP,
    (CONST rosStrcDesc *)&USER_TABLES_bind,
    (rosQDesc*)&querydesc,ARRAYSIZE,&curs );
if (rc != rosERR_OK)
{ DISCARD roserr(utc, rosID, &rc, &detailrc, msg; 100 );
    fprintf(stderr,"rostco USER_TABLES: fet rc=%d detailrc=%d ",rc,detailrc);
    roderr (utc,rosID, "table fetch","",detailrc);
    exit(-1);
}
else
{
    for (i = 0; i < tab_read_arrp->sxnstructs_rosStrcArr; i++)
    table_instP = tab_read_arrP->sxstructP_rosStrcArr[ i ];
    table_instP->column = NULLP(rosStrcArr);
    table_instP->constr = NULLP(rosStrcArr);
    routxc(utc, table_instP, &USE_TABLES_bind_);
    col_read_arrP = NULLP(rosStrcArr);
    con_read_arrP = NULLP(rosStrcArr);
```

```
col_read_arrP = NULLP(rosStrcArr);
/*--------------------------------------------------*/
/* get column element for each root catalog object    */
/*--------------------------------------------------*/
querydesc.qdnpreds_rosQDesc = 1;
querydesc.qdordrco_rosQDesc = 8; /* use 9th entry in binddesc to ordBy */
/*--------------------------------------------------*/
/* form USER_TABLES ->USER_TAB_COLUMNS join predicate     */
/* where USER_TABLES.TABLE_NAME = USER_TAB_COLUMNS.TABLE_NAME  */
/*--------------------------------------------------*/
rosqds (utc, &querydesc,
  1,"TABLE_NAME",
    rosCOMPOP_EQ,table_instP->table_name, /* form JOIN predicate */
    rOSTYPE_TEXTP,
    rosBOOLOP_NOP);
rc = ROSFET(utc, rosID,
  "USER_TAB_COLUMNS", &col_read_arrP,
  (CONST rosStrcDesc *)&USER_TAB_COLUMNS_bind,
  (rosQDesc*)&querydesc,ARRAYSIZE,&curs );
if (rc != rosERR_OK)
{ DISCARD roserr(utc, rosID, &rc, &detailrc, msg, 100 );
  fprintf(stderr,"rostco USER_TCOLS: fet rc=%d detailrc=%d ",
    rc,detailrc);
  roderr(utc, rosID, "cols fetch","",detailrc);
  exit(-1);
}
else
{
  for (m = 0; m < col_read_arrP->sxnstructs_rosStrcArr; m++)
  {
    col_instp = col_read_arrP->sxstructp_rosStrcArr[ m ];
    routxc( utc, col_instP, &USER_TAB_COLUMNS_bind );
  }
}
table_instP->column = col_read_arrP;
/*--------------------------------------------------*/
/* get constraint element for each root catalog object  */
/*--------------------------------------------------*/
querydesc.qdnpreds_rosQDesc = 1;
querydesc.qdordrco_rosQDesc = 0;
/*--------------------------------------------------*/
/* form USER_TABLES -> USER_CONSTRAINTS join predicate    */
/* where USER_TABLES.TABLE_NAME = USER_CONSTRAINTS.TABLE_NAME */
/*--------------------------------------------------*/
rosqds (utc, &querydesc,
  1, "TABLE_NAME",
    rosCOMPOP_EQ, table_instP->table_name,
    rosTYPE_TEXTP,
    rosBOOLOP_NOP);
rc = ROSFET(utc, rosID,
  "USER_CONSTRAINTS", &con_read_arrP,
  (CONST rosStrcDesc *) &USER_CONSTRAINTS_bind,
  (rosQDesc*)&querydesc,ARRAYSIZE,&curs );
if (rc != rosERR_OK)
{ DISCARD roserr(utc, rosID, &rc, &detailrc, msg, 100 );
  fprintf(stderr,"rostco USER_CONSTRAINTS: fet rc=%d detailrc=%d ",
    rc,detailrc);
  roderr(utc,rosID, "cons fetch","",detailrc);
  exit(-1);
}
table_instp->constr = con_read_arrP;
if (rc > 0)
  for (k = 0; k < con_read_arrP->sxnstructs_rosStrcArr; k++)
  {
  constr_instp = con_read_arrP->sxstructP_rosStrcArr[k];
/*--------------------------------*/
/* get constraint children columns    */
/*--------------------------------*/
querydesc.qdnpreds_rosQDesc = 3;
querydesc.qdordrco_rosQDesc = 0;
/*--------------------------------------------------*/
/* form USER_CONSTRAINTS-->USER_CONS_COLUMNS join predicate  */
/* where USER_CONSTRAINTS.OWNER = USER_CONS_COLUMNS.OWNER  */
/* and USER_CONSTRAINTS.TABLE_NAME = USER_CONS_COLUMNS.TABLE_ */
/* and USER_CONSTRAINTS.CONSTRAINT_NAME = USER_CONS_COLUMNS.C */
/*--------------------------------------------------*/
  rosqds (utc, &querydesc,
    1, "OWNER",
    rosCOMPOP_EQ, constr_instP->owner,
    rosTYPE_TEXTP,
```

-continued

```
    rosBOOLOP_AND);
rosqds (utc, &querydesc,
    2,"TABLE_NAME",
    rosCOMPOP_EQ, conStr_instP->table_name,
    rosTYPE_TEXTP,
    rosBOOLOP_AND);
rosqds(utc, &querydesc,
    3,"CONSTRAINT_NAME",
    rosCOMPOP_EQ, constr_instP->constr_name,
    rosTYPE_TEXTP,
    rosBOOLOP_NOP);
rc = ROSFET(utc, rosID,
    "USER_CONS_COLUMNS", &ccl_read_arrP,
    (CONST rosStrcDesc *)&USER_CONS_COLUMNS_bind,
    (rosQDesc*) &querydesc,ARRAYSIZE, &curs );
if *(rc != rosERR_OK)
{ DISCARD roserr(utc, rosID, &rc, &detailrc, msg, 100 );
    fprintf(stderr,
        "rostco USER_CONS_COLS: fet rc=%d detailrc=%d ",
        rc,detailrc);
    roderr(utc,rosID, "cons col fetch","",detailrc);
    exit(-1);
}
constr_instP->constr_col = ccl_rea_arrP;
        }
    }
}
rosprt (utc,stdout,tab_read_arrP->sxstructP_rosStrcArr[0],&USER_TABLES_bind,0);
rc = roscls(utc, rosID );
rc = rostrm(utc);
DISCARD utcnd(utc);
exit(0);
}
```

I claim:

1. A resource object store, comprising:
   a persistent store;
   a bind descriptor that maps each of a plurality of attributes of a resource object to corresponding fields of the persistent store;
   routine having an application program interface that enables an application program to pass a c-structure containing the attributes to the routine such that the routine receives the c-structure through the application program interface and reads the bind descriptor to determine the fields of the persistent store that correspond to the attributes and then stores each attribute passed in the c-structure into the fields of the persistent store, whereby application programs may utilize the resource object store by passing a c-structure of a resource object via an application program interface.

2. The resource object store of claim 1, wherein the bind descriptor is created by the application program.

3. The resource object store of claim 1, wherein the bind descriptor is created by the resource object store.

4. The resource object store of claim 1, wherein the persistent store comprises a database and wherein the bind descriptor maps each attribute passed in the c-structure to a field of the database.

5. The resource object store of claim 4, wherein the routine stores the attributes passed by the c-structure into the fields of the data base by generating an SOL INSERT statement for each attribute passed by the c-structure.

6. The resource object store of claim 4, wherein the bind descriptor includes a set of entries each comprising:
   field for identifying a portion of the database for storing one of the attributes;
   field for identifying the c-structure;
   field for identifying one of the attributes in the c-structure;
   field for identifying a data type for one of the attributes.

7. The resource object store of claim 1, further comprising a set of child bind descriptors that map at least one attribute of each of a set of child c-structures passed by the application program to corresponding fields of the persistent store.

8. The resource object store of claim 7, wherein the routine reads the child bind descriptors to determine the fields of the persistent store that correspond to the attributes passed in the child c-structures and then stores the attributes passed in the child c-structures into the fields of the persistent store.

9. The resource object store of claim 8, wherein the bind descriptor and the child bind descriptors are created by the application program.

10. The resource object store of claim 8, wherein the bind descriptor and the child bind descriptors are created by the resource object store.

11. The resource object store of claim 8, wherein the persistent store comprises a database and wherein the bind descriptor and the child bind descriptors map the attributes passed in the c-structure and the child c-structure to corresponding fields of the database.

12. The resource object store of claim 11, wherein the routine stores the attributes passed by the c-structure and the child c-structure into the data base by generating an SQL INSERT statement for each attribute passed by the c-structure and the child c-structures.

13. The resource object store of claim 1, wherein the resource object store comprises a linear store and wherein the bind descriptor maps the c-structure to fields of the linear store.

14. A resource object store, comprising:
   a database;
   a linear store;
   a bind descriptor that maps each of a plurality of attributes of a resource object to corresponding fields of the database or the linear store;

routine having an application program interface that enables an application program to pass a c-structure containing the attributes to the routine such that the routine receives the c-structure through the application program interface and reads the bind descriptor to determine the fields of the database or the linear store that correspond to the attributes and then stores each attribute passed in the c-structure into the fields of the database or the linear store, whereby application programs may utilize the resource object store by passing a c-structure of a resource object via an application program interface.

15. The resource object store of claim 14, wherein the bind descriptor is created by the application program.

16. The resource object store of claim 14, wherein the bind descriptor is created by the resource object store.

17. The resource object store of claim 14, wherein the bind descriptor includes a set of entries each comprising:

field for identifying a portion of the database or the linear store for storing one of the attributes;

field for identifying the c-structure;

field for identifying one of the attributes in the c-structure;

field for identifying a data type for one of the attributes.

18. The resource object store of claim 14, further comprising a set of child bind descriptors that map at least one attribute of each of a set of child c-structures passed by the application program to corresponding fields of the database or the linear store.

19. The resource object store of claim 18, wherein the routine reads the child bind descriptors to determine the fields of the database or the linear store that correspond to the attributes passed in the child c-structures and then stores the attributes passed in the child c-structures into the fields of the database or the persistent store.

20. The resource object store of claim 19, wherein the bind descriptor and the child bind descriptors are created by the application program.

21. The resource object store of claim 19, wherein the bind descriptor and the child bind descriptors are created by the resource object store.

22. A resource object store, comprising:

a persistent store;

hierarchical binding structure comprising a bind descriptor and a set of child bind descriptors wherein the hierarchical binding structure maps a plurality of attributes of a resource object to corresponding fields of the persistent store;

routine having an application program interface that enables an application program to pass a c-structure and a set of child c-structures containing the attributes to the routine such that the routine receives the c-structure and the child c-structures through the application program interface and reads the bind descriptor and the child bind descriptors to determine the fields of the persistent store that correspond to the attributes and then stores each attribute passed in the c-structure and the child c-structures into the fields of the persistent store, whereby application programs may utilize the resource object store by passing a c-structure of a resource object via an application program interface.

23. The resource object store of claim 22, wherein the bind descriptor and the child bind descriptors are created by the application program.

24. The resource object store of claim 22, wherein the bind descriptor and the child bind descriptors are created by the resource object store.

25. The resource object store of claim 22, wherein the persistent store comprises a database and wherein the bind descriptor and the child bind descriptors map the attributes passed in the c-structure and the child c-structure to corresponding fields of the database.

26. The resource object store of claim 25, wherein the routine stores the attributes passed by the c-structure and the child c-structure into the data base by generating an SQL INSERT statement for each attribute passed by the c-structure and the child c-structures.

27. A method for accessing a resource object store, comprising the steps of:

creating a bind descriptor that maps each of a plurality of attributes of a resource object to corresponding fields of a persistent store;

receiving a c-structure, from an application program, that contains the attributes;

reading the bind descriptor to determine the fields of the persistent store that correspond to the attributes contained in the c-structure;

storing each attribute passed in the c-structure into the fields of the persistent store, whereby application programs may utilize the resource object store by passing a c-structure of a resource object.

28. The method of claim 27, wherein the persistent store comprises a database and wherein the step of creating a bind descriptor comprises the step of creating a bind descriptor that maps each attribute passed in the c-structure to a field of the database.

29. The method of claim 28, wherein the step of storing comprises the step of generating an SOL INSERT statement for each attribute passed by the c-structure.

30. The method of claim 28, wherein the step of creating a bind descriptor comprises the step of creating a bind descriptor that includes a set of entries each comprising:

field for identifying a portion of the database for storing one of the attributes;

field for identifying the c-structure;

field for identifying one of the attributes in the c-structure;

field for identifying a data type for one of the attributes.

31. The method of claim 27, wherein the resource object store comprises a linear store and wherein the step of creating a bind descriptor comprises the step of creating a bind descriptor that maps each attribute passed in the c-structure to a field of the linear store.

32. The method of claim 27, wherein the step of creating a bind descriptor further comprises the step of creating a set of child bind descriptors that each map at least one child attribute of the resource object to corresponding fields of the persistent store.

33. The method of claim 32, wherein the steps of creating a c-structure containing the attributes and passing the c-structure to a routine in the resource object store further comprises the steps of creating a set of child c-structures containing the child attributes and passing the child c-structures to the routine.

34. The method of claim 33, wherein the step of reading the bind descriptor to determine the fields of the persistent store that correspond to the attributes contained in the c-structure further comprises the step of reading the child bind descriptors to determine the fields of the persistent store that correspond to the child attributes contained in the child c-structures.

35. The method of claim 34, wherein the step of storing each attribute passed in the c-structure into the fields of the persistent store further comprises the step of storing each child attribute passed in the child c-structures into the fields of the persistent store.

36. The method of claim 32, wherein the persistent store comprises a database and wherein the bind descriptor and the child bind descriptors map the attributes passed in the c-structure and the child c-structure to corresponding fields of the database.

37. The method of claim 36, wherein the step of storing each child attribute comprises the step of generating an SQL INSERT statement for each child attribute passed by the child c-structures.

38. The method of claim 32, wherein the resource object store comprises a linear store and wherein the child bind descriptors map the child c-structures to fields of the linear store.

39. An apparatus for accessing a resource object store, comprising:
    means for creating a bind descriptor that maps each of a plurality of attributes of a resource object to corresponding fields of a persistent store;
    means for receiving a c-structure c that contains the attributes and;
    means for reading the bind descriptor to determine the fields of the persistent store that correspond to the attributes contained in the c-structure;
    means for storing each attribute passed in the c-structure into the fields of the persistent store, whereby application programs may utilize the resource object store by passing a c-structure of a resource object.

40. The apparatus of claim 39, wherein the persistent store comprises a database and wherein the means for creating a bind descriptor comprises means for creating a bind descriptor that maps each attribute passed in the c-structure to a field of the database.

41. The apparatus of claim 40, wherein the means for storing comprises means for generating an SQL INSERT statement for each attribute passed by the c-structure.

42. The apparatus of claim 40, wherein the means for creating a bind descriptor comprises means for creating a bind descriptor that includes a set of entries each comprising:
    field for identifying a portion of the database for storing one of the attributes;
    field for identifying the c-structure;
    field for identifying one of the attributes in the c-structure;
    field for identifying a data type for one of the attributes.

43. The apparatus of claim 39, wherein the resource object store comprises a linear store and wherein the means for creating a bind descriptor comprises means for creating a bind descriptor that maps each attribute passed in the c-structure to a field of the linear store.

44. The apparatus of claim 39, wherein the means for creating a bind descriptor further comprises means for creating a set of child bind descriptors that each map at least one child attribute of the resource object to corresponding fields of the persistent store.

45. The apparatus of claim 44, wherein the means for creating a c-structure containing the attributes and passing the c-structure to a routine in the resource object store further comprises means for creating a set of child c-structures containing the child attributes and passing the child c-structures to the routine.

46. The apparatus of claim 45, wherein the means for reading the bind descriptor to determine the fields of the persistent store that correspond to the attributes contained in the c-structure further comprises means for reading the child bind descriptors to determine the fields of the persistent store that correspond to the child attributes contained in the child c-structures.

47. The apparatus of claim 46, wherein the means for storing each attribute passed in the c-structure into the fields of the persistent store further comprises means for storing each child attribute passed in the child c-structures into the fields of the persistent store.

48. The apparatus of claim 46, wherein the persistent store comprises a database and wherein the bind descriptor and the child bind descriptors map the attributes passed in the c-structure and the child c-structure to corresponding fields of the database.

49. The apparatus of claim 48, wherein the means for storing each child attribute comprises means for generating an SQL INSERT statement for each child attribute passed by the child c-structures.

50. The apparatus of claim 44, wherein the resource object store comprises a linear store and wherein the child bind descriptors map the child c-structures to fields of the linear store.

51. A computer readable medium having a set of instructions stored therein, which when executed by a computer, causes the computer to access a resource object store by performing the steps of:
    creating a bind descriptor that maps each of a plurality of attributes of a resource object to corresponding fields of a persistent store;
    receiving a c-structure c that contains the attributes and;
    reading the bind descriptor to determine the fields of the persistent store that correspond to the attributes contained in the c-structure;
    storing each attribute passed in the c-structure into the fields of the persistent store, whereby application programs may utilize the resource object store by passing a c-structure of a resource object.

52. The computer readable medium of claim 51, wherein the persistent store comprises a database and wherein the step of creating a bind descriptor comprises the step of creating a bind descriptor that maps each attribute passed in the c-structure to a field of the database.

53. The computer readable medium of claim 52, wherein the step of storing comprises the step of generating an SQL INSERT statement for each attribute passed by the c-structure.

54. The computer readable medium of claim 52, wherein the step of creating a bind descriptor comprises the step of creating a bind descriptor that includes a set of entries each comprising:
    field for identifying a portion of the database for storing one of the attributes;
    field for identifying the c-structure;
    field for identifying one of the attributes in the c-structure;
    field for identifying a data type for one of the attributes.

55. The computer readable medium of claim 51, wherein the resource object store comprises a linear store and wherein the step of creating a bind descriptor comprises the step of creating a bind descriptor that maps each attribute passed in the c-structure to a field of the linear store.

56. The computer readable medium of claim 51, wherein the step of creating a bind descriptor further comprises the step of creating a set of child bind descriptors that each map at least one child attribute of the resource object to corresponding fields of the persistent store.

57. The computer readable medium of claim 56, wherein the steps of creating a c-structure containing the attributes and passing the c-structure to a routine in the resource object store further comprises the steps of creating a set of child c-structures containing the child attributes and passing the child c-structures to the routine.

58. The computer readable medium of claim 57, wherein the step of reading the bind descriptor to determine the fields of the persistent store that correspond to the attributes contained in the c-structure further comprises the step of reading the child bind descriptors to determine the fields of the persistent store that correspond to the child attributes contained in the child c-structures.

59. The computer readable medium of claim 58, wherein the step of storing each attribute passed in the c-structure into the fields of the persistent store further comprises the step of storing each child attribute passed in the child c-structures into the fields of the persistent store.

60. The computer readable medium of claim 57, wherein the persistent store comprises a database and wherein the bind descriptor and the child bind descriptors map the attributes passed in the c-structure and the child c-structure to corresponding fields of the database.

61. The computer readable medium of claim 60, wherein the step of storing each child attribute comprises the step of generating an SQL INSERT statement for each child attribute passed by the child c-structures.

62. The computer readable medium of claim 56, wherein the resource object store comprises a linear store and wherein the child bind descriptors map the child c-structures to fields of the linear store.

* * * * *